US012446328B2

(12) United States Patent
Chen

(10) Patent No.: US 12,446,328 B2
(45) Date of Patent: Oct. 14, 2025

(54) SOLAR ENERGY GENERATION SYSTEM

(71) Applicant: BOHAN TECHNOLOGIES CO., LTD., Taichung (TW)

(72) Inventor: Wen-Yu Chen, Taichung (TW)

(73) Assignee: BOHAN TECHNOLOGIES CO., LTD., Taichung (TW)

( * ) Notice: Subject to any disclaimer, the term of this patent is extended or adjusted under 35 U.S.C. 154(b) by 0 days.

(21) Appl. No.: 18/207,345

(22) Filed: Jun. 8, 2023

(65) Prior Publication Data

US 2024/0072185 A1 Feb. 29, 2024

(30) Foreign Application Priority Data

Aug. 31, 2022 (TW) .................................. 111132993

(51) Int. Cl.
*H10F 19/20* (2025.01)
*H10F 19/80* (2025.01)
*H10F 77/48* (2025.01)

(52) U.S. Cl.
CPC ........... *H10F 19/20* (2025.01); *H10F 19/807* (2025.01); *H10F 77/48* (2025.01)

(58) Field of Classification Search
None
See application file for complete search history.

(56) References Cited

U.S. PATENT DOCUMENTS

| 4,868,004 A * | 9/1989 | Zultzke | G02B 1/14 |
| | | | 427/166 |
| 2010/0089436 A1* | 4/2010 | Watters | H01L 31/0547 |
| | | | 136/246 |
| 2010/0096073 A1* | 4/2010 | Adriani | H01L 31/048 |
| | | | 156/160 |
| 2015/0325734 A1* | 11/2015 | Pisharodi | H02S 40/44 |
| | | | 136/246 |
| 2018/0323331 A1* | 11/2018 | Morgan | H02S 20/23 |

FOREIGN PATENT DOCUMENTS

| AU | 2019422926 A1 * | 8/2021 | ............. F24S 10/25 |
| JP | 2011165772 A * | 8/2011 | |

OTHER PUBLICATIONS

Machine translation of JP2011165772A (Year: 2011).*

* cited by examiner

*Primary Examiner* — Ryan S Cannon
(74) *Attorney, Agent, or Firm* — Birch, Stewart, Kolasch & Birch, LLP

(57) ABSTRACT

A solar energy generation system includes a first solar panel, a second solar panel, and at least one side reflection plate. The first solar panel includes a first top surface adapted to convert solar energy to electricity and a first bottom surface opposite to the first top surface. The second solar panel is disposed below the first solar panel and includes a second top surface for converting solar energy to electricity and facing the first bottom surface of the first solar panel. The side reflection plate is disposed on a side of the first solar panel and the second solar panel. A radius of curvature of a reflection surface of the side reflection plate ranges between 2000 mm and 5000 mm. The side reflection plate is for reflecting sunlight to the first bottom surface of the first solar panel and the second top surface of the second solar panel.

9 Claims, 7 Drawing Sheets

SOLAR ENERGY GENERATION SYSTEM

BACKGROUND OF THE INVENTION

Technical Field

The present invention relates generally to a technical field of solar energy generation, and more particularly to a solar energy generation system, which could increase an area of receiving light.

Description of Related Art

With the promotion of environmental protection consciousness and the development of renewable energy in recent years, many countries in the world encourage using renewable energy for power generation, for example, wind energy generation, hydraulic energy generation, solar energy generation, geothermal energy generation, tidal energy generation, etc., wherein the solar energy generation is one of the most potential generation ways among different renewable energy generation ways.

Typically, a solar panel is disposed in a place that allows the solar panel to receive sunlight for solar energy generation, wherein when the sunlight is irradiated on the solar panel, the solar panel converts solar energy of the sunlight to electricity. However, in order to provide sufficient electricity, a place having a large area is required for disposing the solar panel, which is not easy to find such a suitable place in a densely populated region. Thus, how to efficiently use a limited space and increase power generation efficiency in a place with a limited area is a problem needed to be solved in the industry.

BRIEF SUMMARY OF THE INVENTION

In view of the above, the primary objective of the present invention is to provide a solar energy generation system, which could increase power generation efficiency in a place with a limited area.

The present invention provides a solar energy generation system including a first solar panel, a second solar panel, and at least one side reflection plate. The first solar panel includes a first top surface adapted to convert solar energy to electricity and a first bottom surface opposite to the first top surface. The second solar panel is disposed below the first solar panel and includes a second top surface adapted to convert solar energy to electricity, wherein the second top surface faces the first bottom surface of the first solar panel. The at least one side reflection plate is disposed on a side of the first solar panel and the second solar panel, wherein a radius of curvature of a reflection surface of the at least one side reflection plate ranges between 2000 mm and 5000 mm. The at least one side reflection plate is adapted to reflect sunlight to the first bottom surface of the first solar panel and the second top surface of the second solar panel.

With the aforementioned design, by disposing the first solar panel and the second solar panel in a two-layer way, the solar energy generation system of the present invention could efficiently use the limited space and reduce the area for disposing multiple solar panels, and the at least one side reflection plate disposed on the side of the first solar panel and the second solar panel reflects sunlight to the second solar panel for efficient photoelectric conversion. Additionally, with the radius of curvature of the reflection surface of the at least one side reflection plate ranging between 2000 mm and 5000 mm, the solar energy generation system of the present invention could increase sunlight received by the second solar panel per unit area when compared to the conventional flat reflection plate, thereby achieving the purpose of increasing power generation efficiency in the place with the limited area.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
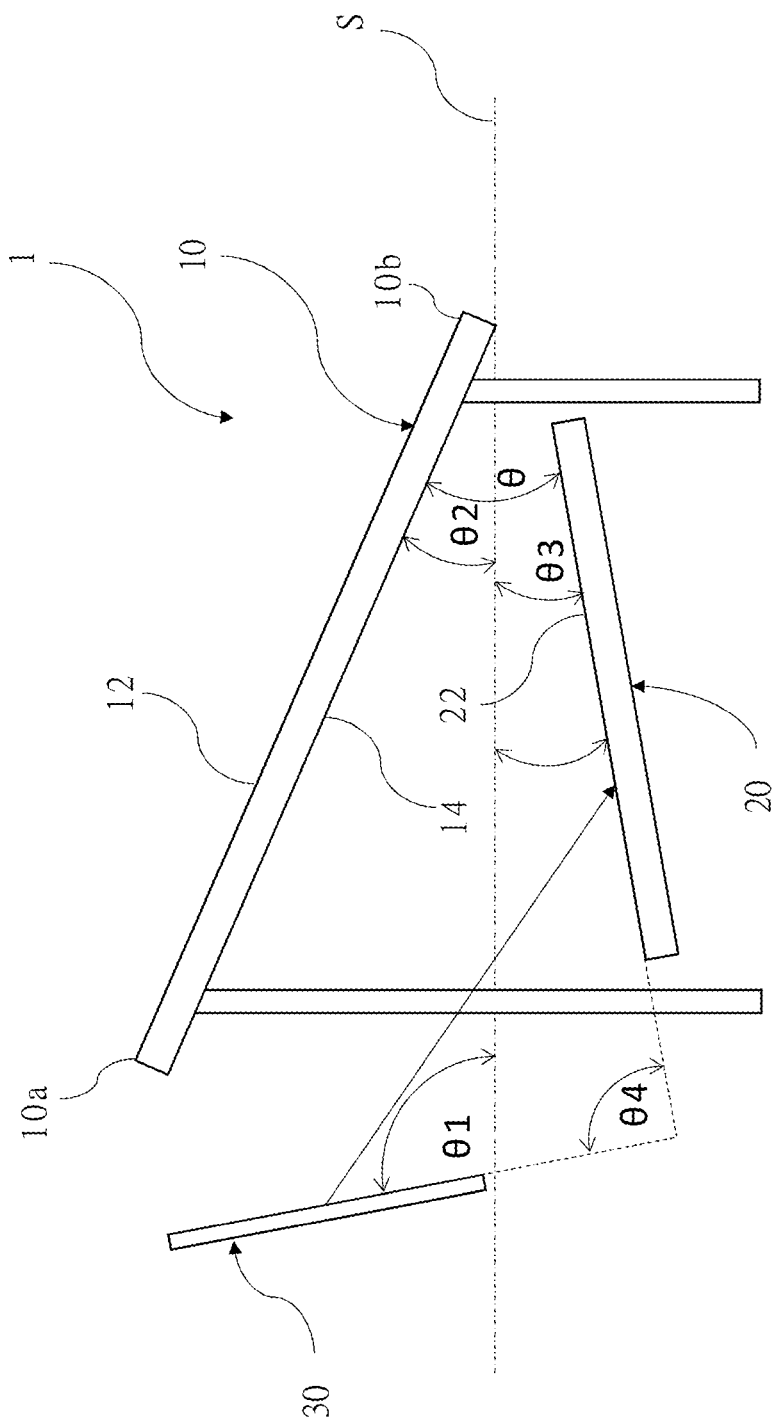
FIG. 1 is a schematic side view of the solar energy generation system according to a first embodiment of the present invention.
Figure 2:
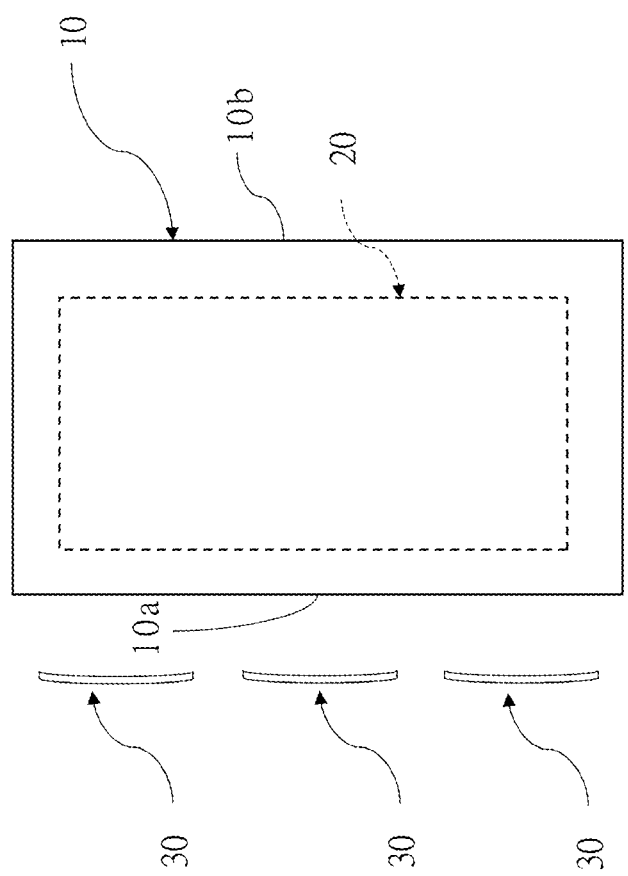
FIG. 2 is a schematic top view of the solar energy generation system according to the first embodiment of the present invention.

A solar energy generation system 1 according to a first embodiment of the present invention is illustrated in FIG. 1 and FIG. 2 and includes a first solar panel 10, a second solar panel 20, and a plurality of side reflection plates 30.

The first solar panel 10 includes a first top surface 12 adapted to convert solar energy to electricity and a first bottom surface 14 opposite to the first top surface 12. The second solar panel 20 includes a second top surface 22 adapted to convert solar energy to electricity. The second solar panel 20 is disposed below the first solar panel 10, wherein the second top surface 22 faces the first bottom surface 14 of the first solar panel 10, and an area of the first solar panel 10 is greater than an area of the second solar panel 20, so that more than one solar panels could be disposed in a limited area. In the current embodiment, only the second solar panel 20 is disposed below the first solar panel 10 as an example. In practice, one or more solar panels could be disposed below the second solar panel 20 and arranged parallel to the second solar panel 20.

As shown in FIG. 1 and FIG. 2, the side reflection plates 30 are disposed on a side of the first solar panel 10 and the second solar panel 20, so that the side reflection plates 30 could reflect sunlight to the first bottom surface 14 of the first solar panel 10 and the second top surface 22 of the second solar panel 20. A horizontal reference surface S located between the first solar panel 10 and the second solar panel 20 is defined. The first solar panel 10 has a high side 10a and a low side 10b opposite to the high side 10a, wherein the high side 10a is located farther from the horizontal reference surface S than the low side 10b. As shown in FIG. 2, each of the side reflection plates 30 is disposed at a position close to the high side 10a and away from the low side 10b, thereby beneficial for each of the side reflection plates 30 to reflect sunlight to the second top surface 22 of the second solar panel 20.

In the current embodiment, the number of the side reflection plates 30 is three as an example. In other embodiments, the number of the side reflection plates 30 could be one or more, which could achieve the purpose of reflecting sunlight to the first bottom surface 14 of the first solar panel 10 or the second top surface 22 of the second solar panel 20 as well.

Figure 3:
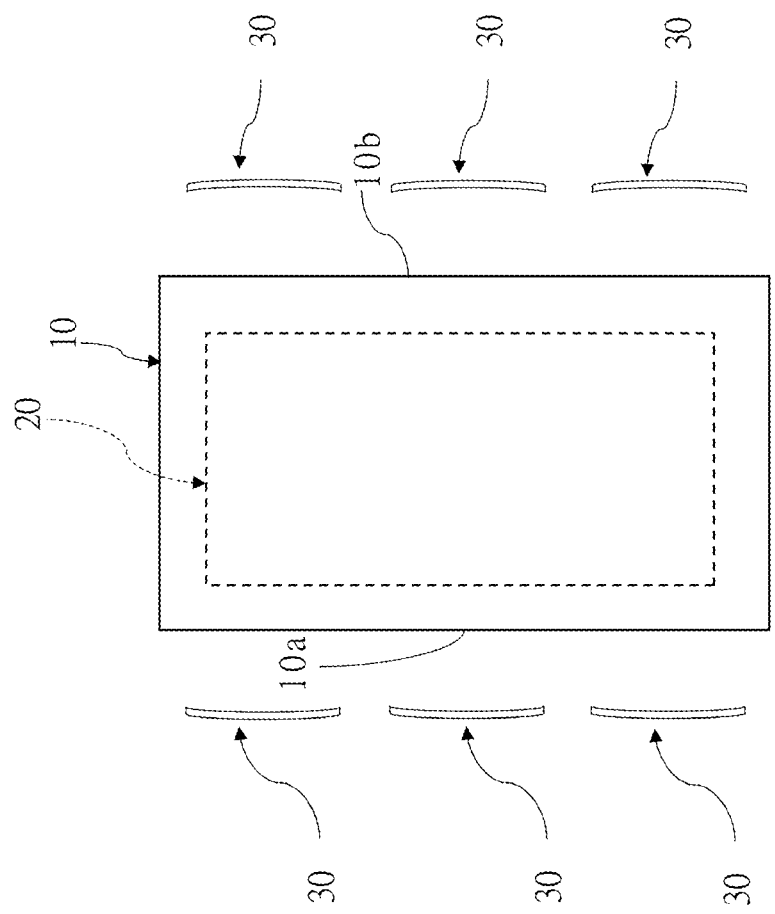
FIG. 3 is a schematic top view of the solar energy generation system according to another embodiment of the present invention, showing the side reflection plates being respectively disposed at the position close to the hight side of the first solar panel and the position close to the low side of the first solar panel.
Figure 4:
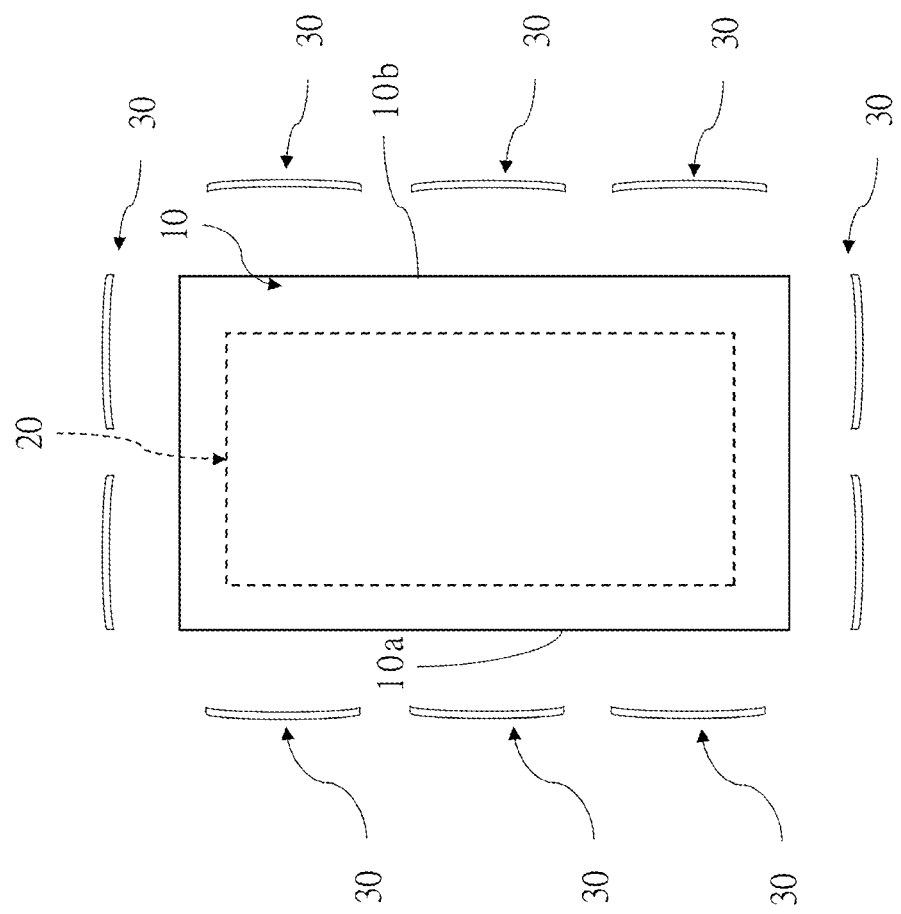
FIG. 4 is a schematic top view of the solar energy generation system according to still another embodiment of the present invention, showing the side reflection plates being respectively disposed at the position close to the hight side of the first solar panel, the position close to the low side of the first solar panel, and two lateral sides of the first solar panel at the same time.

In the current embodiment, the side reflection plates 30 are disposed at the position close to the high side 10a of the first solar panel 10. In other embodiments, the side reflection plates 30 could be disposed around a periphery of the first solar panel 10, wherein a reflection surface of each of the side reflection plates 30 faces the first solar panel 10. For example, in an embodiment shown in FIG. 3, the side reflection plates 30 could be respectively disposed at the position close to the high side 10a of the first solar panel 10 and a position close to the low side 10b of the first solar panel 10; in an embodiment shown in FIG. 4, the side reflection plates 30 could be respectively disposed at the position close to the high side 10a of the first solar panel 10, the position close to the low side 10b of the first solar panel 10, and on two lateral sides of the first solar panel 10 at the same time, so that more sunlight could be reflected to the first bottom surface 14 of the first solar panel 10 or the second top surface 22 of the second solar panel 20.

A radius of curvature (R) of the reflection surface of each of the side reflection plates 30 ranges between 2000 mm and 5000 mm, preferably between 2500 mm and 5000 mm. In the current embodiment, each of the side reflection plates 30 is a concave mirror as an example, wherein a radius of curvature (R) of a reflection surface of the concave mirror is 2500 mm, and the reflection surface of each of the side reflection plates 30 has a plurality of convex surfaces adapted to reflect sunlight to the first bottom surface 14 of the first solar panel 10 or the second top surface 22 of the second solar panel 20.

As shown in FIG. 1, an angle θ is formed between the first bottom surface 14 of the first solar panel 10 and the second top surface 22 of the second solar panel 20, and ranges between 0° and 45°. A first angle θ1 is formed between the horizontal reference surface S and a side of each of the side reflection plates 30 facing the first solar panel 10 and the second solar panel 20, and ranges between 95° and 140°, preferably between 100° and 135°. A second angle θ2 is formed between the first bottom surface 14 of the first solar panel 10 and the horizontal reference surface S, and ranges between 0° and 25°. A third angle θ3 is formed between the second top surface 22 of the second solar panel 20 and the horizontal reference surface S, and ranges between 0° and 20°.

For example, when the solar energy generation system 1 is disposed in a region located in a latitude of 23.5° N, the first top surface 12 of the first solar panel 10 is disposed to face the South, and each of the side reflection plates 30 is disposed on a north side of the first solar panel 10, wherein the second angle θ2 between the first bottom surface 14 of the first solar panel 10 and the horizontal reference surface S could be 23.5°, and the third angle θ3 between the second top surface 22 of the second solar panel 20 and the horizontal reference surface S could range between 0° and 20°; when the third angle θ 3 is 0°; a fourth angle θ4 formed between the second solar panel 20 and the side reflection plates 30 ranges between 96.5° and 138.5°, preferably between 100° and 135°; when the third angle θ3 is 20°, the fourth angle θ4 formed between the second solar panel 20 and the side reflection plates 30 ranges between 77.5° and 118.5°, preferably between 80° and 115°.

Figure 5:
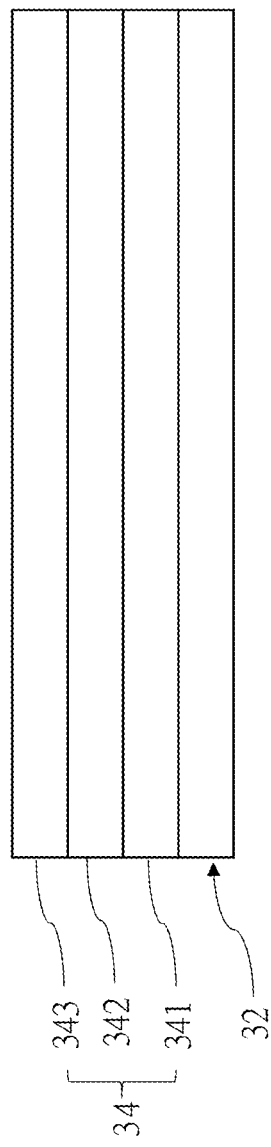
FIG. 5 is a schematic view of the glass substrate and the reflection film according to the first embodiment of the present invention.

In the current embodiment, the reflection surface of each of the side reflection plates 30 has a glass substrate 32 and a reflection film 34 disposed on the glass substrate 32, wherein a reflectance of the reflection film 34 to light with a wavelength between 350 nm and 1100 nm ranges between 80% and 96%. As shown in FIG. 5, the reflection film 34 includes a connecting layer 341, a reflection layer 342, and a protection layer 343 that are stacked in order, wherein the connecting layer 341 is adapted to connect the glass substrate 32 and the reflection layer 342. A refractive index of the reflection layer 342 to light with a wavelength between 350 nm and 1100 nm ranges between 0.2 and 1.9. The connecting layer 341 is a film formed by at least one material selected from a group consisting of $Al_2O_3$, Ni, Cr, $SiO_2$, ITO, Nb, $TiO_2$, and a combination thereof, and has a thickness between 10 Å and 1000 Å, preferably between 50 Å and 500 Å. The reflection layer 342 is a film formed by at least one material selected from a group consisting of Ag, Al, silver alloy (such as Ag2.7Pd, Ag6Au), and a combination thereof, and has a thickness between 50 Å and 2000 Å, preferably between 100 Å and 1500 Å. The protection layer 343 is a film formed by at least one material selected from a group consisting of $Al_2O_3$, $Nb_2O_5$, $Ta_2O_5$, $TiO_2$, $SiO_2$, and a combination thereof, and has a thickness between 10 Å and 1000 Å, preferably between 50 Å and 800 Å.

TABLE 1 refractive index of the aforementioned materials

| | Refractive index | | | |
|---|---|---|---|---|
| Material | @350 nm | @550 nm | @900 nm | @1100 nm |
| Ag | 0.209 | 0.124 | 0.18 | 0.235 |
| Al | 0.385 | 0.963 | 1.86 | 1.2 |
| $Al_2O_3$ | 1.7155 | 1.6825 | 1.6686 | 1.665 |
| ITO | 2.211 | 1.922 | 1.764 | |
| Nb | 2.48 | 2.93 | 1.76 | 1.55 |
| $Nb_2O_5$ | 2.7622 | 2.3603 | 2.2676 | 2.2515 |
| Ni | 1.63 | 1.8 | 2.696 | 2.97 |
| Cr | 1.77 | 3.11 | 3.29 | 3.5884 |
| $SiO_2$ | 1.476 | 1.46 | 1.452 | 1.449 |
| $Ta_2O_5$ | | 2.2305 | 2.1454 | 2.127 |
| $TiO_2$ | 4.477 | 2.954 | 2.77 | 2.742 |

Figure 6:
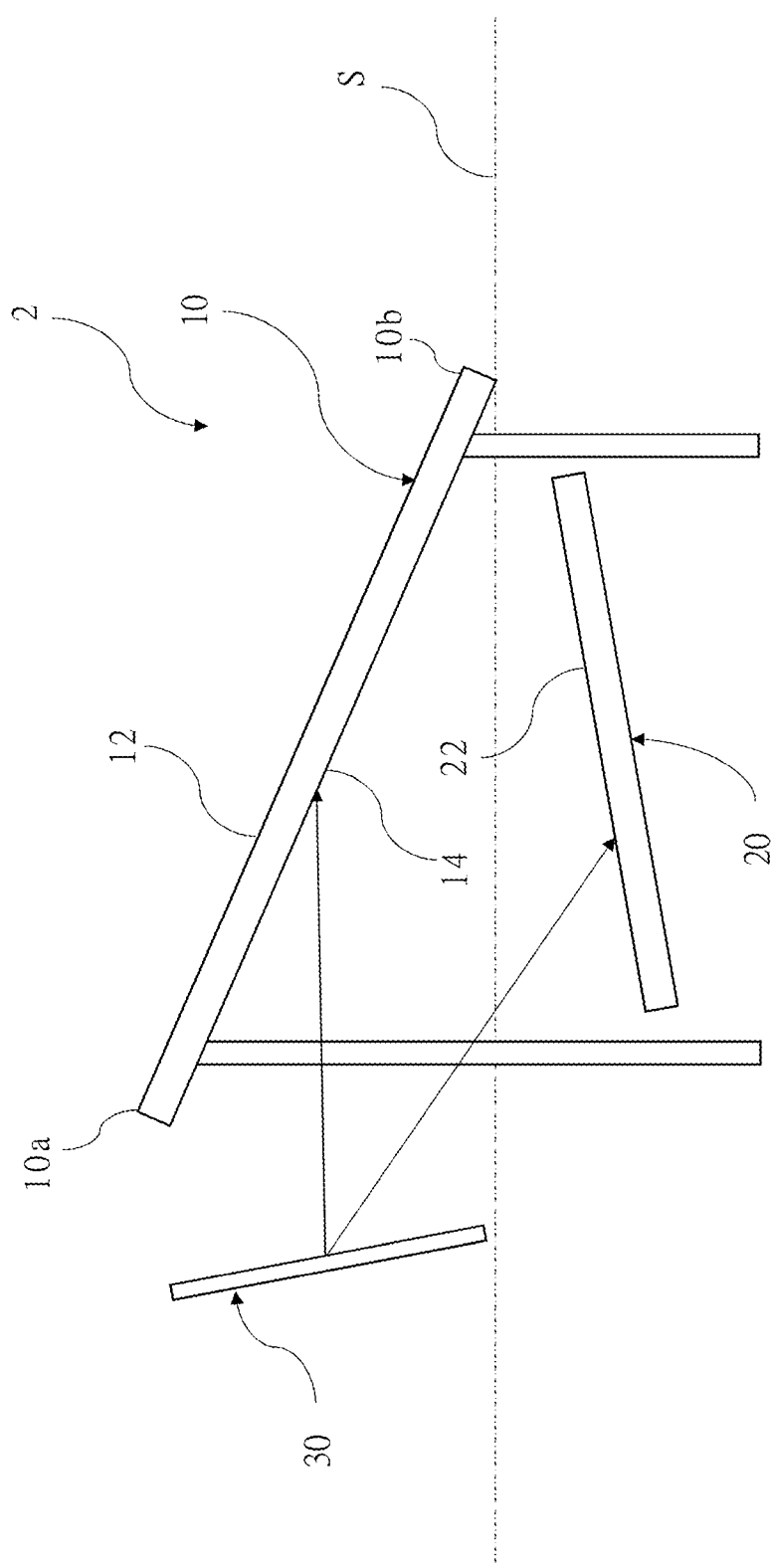
FIG. 6 is a schematic side view of the solar energy generation system according to a second embodiment of the present invention.

A solar energy generation system 2 according to a second embodiment of the present invention is illustrated in FIG. 6 and has almost the same structure as that of the solar energy generation system 1 in the first embodiment, except that the first solar panel 10 in the second embodiment is a bifacial penetrating solar panel, wherein when each of the side reflection plates 30 reflects sunlight to the first bottom surface 14 of the first solar panel 10, the first bottom surface 14 of the first solar panel 10 could also convert solar energy to electricity, thereby increasing power generation efficiency.

Figure 7:
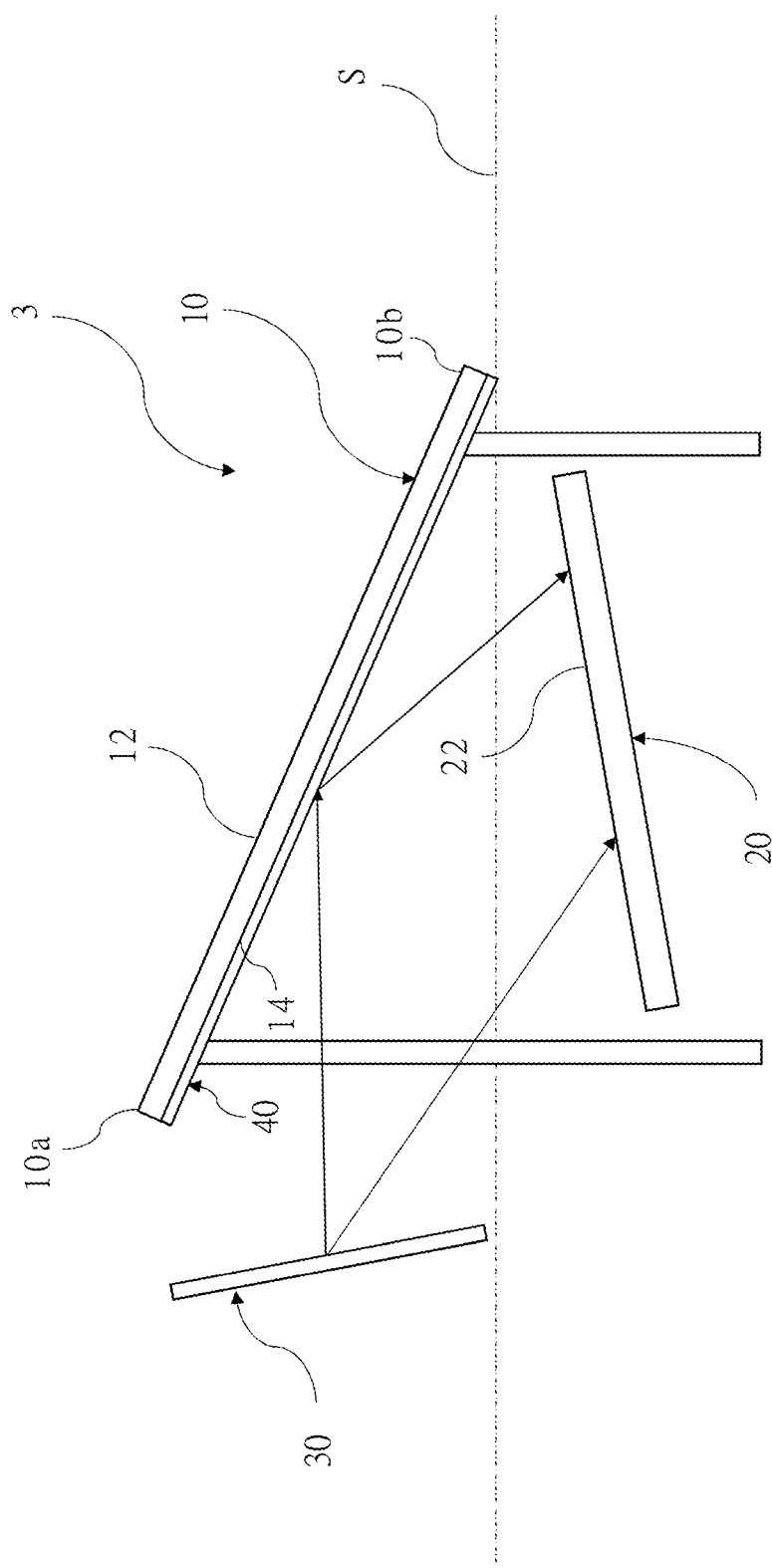
FIG. 7 is a schematic side view of the solar energy generation system according to a third embodiment of the present invention.

A solar energy generation system 3 according to a third embodiment of the present invention is illustrated in FIG. 7 and has almost the same structure as that of the solar energy generation system 1 in the first embodiment, except that the solar energy generation system 3 in the third embodiment includes a bottom reflection plate 40 disposed on the first bottom surface 14 of the first solar panel 10, wherein a radius of curvature (R) of a reflection surface of the bottom reflection plate 40 ranges between 2000 mm and 6000 mm, preferably between 2500 mm and 5000 mm. In the current embodiment, the bottom reflection plate 40 is a concave mirror as an example, wherein a radius of curvature (R) of a reflection surface of the concave mirror is 2500 mm. The reflection surface of the bottom reflection plate 40 has a plurality of convex surfaces adapted to reflect sunlight to the second top surface 22 of the second solar panel 20. In other words, when each of the side reflection plates 30 reflects sunlight to the first bottom surface 14 of the first solar panel 10, the bottom reflection plate 40 disposed on the first bottom surface 14 of the first solar panel 10 could reflect sunlight to the second top surface 22 of the second solar panel 20, thereby increasing power generation efficiency.

Moreover, the bottom reflection plate 40 has almost the same structure as that of each of the side reflection plates 30, wherein the reflection surface of the bottom reflection plate 40 also has a glass substrate 32 and a reflection film 34 disposed on the glass substrate 32. The reflection film 34 of the bottom reflection plate 40 has the same material and structure as the reflection film 34 of each of the side reflection plates 30, and a reflectance of the reflection film 34 of the bottom reflection plate 40 to light with a wavelength between 350 nm and 1100 nm ranges between 80% and 96%. As shown in FIG. 5, the reflection film 34 of the bottom reflection plate 40 includes a connecting layer 341, a reflection layer 342, and a protection layer 343 that are stacked in order, wherein the connecting layer 341 is adapted to connect the glass substrate 32 and the reflection layer 342. A refractive index of the reflection layer 342 to light with a wavelength between 350 nm and 1100 nm ranges between 0.2 and 1.9. The connecting layer 341 is a film formed by at least one material selected from a group consisting of $Al_2O_3$, Ni, Cr, $SiO_2$, ITO, Nb, $TiO_2$, and a combination thereof, and has a thickness between 10 Å and 1000 Å, preferably between 50 Å and 500 Å. The reflection layer 342 is a film formed by at least one material selected from a group consisting of Ag, Al, silver alloy (such as Ag2.7Pd, Ag6Au), and a combination thereof, and has a thickness between 50 Å and 2000 Å, preferably between 100 Å and 1500 Å. The protection layer 343 is a film formed by at least one material selected from a group consisting of $Al_2O_3$, $Nb_2O_5$, $Ta_2O_5$, $TiO_2$, $SiO_2$, and a combination thereof, and has a thickness between 10 Å and 1000 Å, preferably between 50 Å and 800 Å.

With the aforementioned design, by disposing the first solar panel 10 and the second solar panel 20 in a two-layer way, the present invention could efficiently use the limited space and reduce the area for disposing multiple solar panels. Additionally, the at least one side reflection plate 30 disposed on the side of the first solar panel 10 and the second solar panel 20 could achieve efficient photoelectric conversion by reflecting sunlight to the second solar panel 20. Moreover, with the radius of curvature (R) of the reflection surface of the at least one side reflection plate 30 ranging between 2000 mm and 5000 mm, the solar energy generation system of the present invention could increase sunlight received by the second solar panel 20 per unit area when compared to the conventional flat reflection plate, thereby achieving the purpose of increasing power generation efficiency in the place with the limited area.

It must be pointed out that the embodiments described above are only some preferred embodiments of the present invention. All equivalent structures which employ the concepts disclosed in this specification and the appended claims should fall within the scope of the present invention.

What is claimed is:

1. A solar energy generation system, comprising:
a first solar panel comprising a first top surface adapted to convert solar energy to electricity and a first bottom surface opposite to the first top surface;
a second solar panel disposed below the first solar panel and comprising a second top surface adapted to convert solar energy to electricity, wherein the second top surface faces the first bottom surface of the first solar panel; and
at least one side reflection plate disposed on a side of the first solar panel and the second solar panel, wherein a radius of curvature of a reflection surface of the at least one side reflection plate ranges between 2000 mm and 5000 mm; the at least one side reflection plate is adapted to reflect sunlight to the first bottom surface of the first solar panel and the second top surface of the second solar panel,
wherein the solar energy generation system further comprises a bottom reflection plate directly disposed on the first bottom surface of the first solar panel; the bottom reflection plate is adapted to reflect the sunlight from the first bottom surface of the first solar panel to the second top surface of the second solar panel; a radius of curvature of a reflection surface of the bottom reflection plate ranges between 2000 mm and 6000 mm,
wherein the reflection surface of the bottom reflection plate has a glass substrate and a reflection film disposed on the glass substrate; the reflection film of the bottom reflection plate includes a connecting layer, a reflection layer, and a protection layer that are stacked in order; a refractive index of the reflection layer of the bottom reflection plate to light with a wavelength between 350 nm and 1100 nm ranges between 0.2 and 1.9,
wherein an angle is formed between the first bottom surface of the first solar panel and the second top surface of the second solar panel, and ranges between 0° and 45°,
wherein a horizontal reference surface located between the first solar panel and the second solar panel is defined; a first angle is formed between the horizontal reference surface and a side of the at least one side reflection plate facing the first solar panel and the second solar panel, and ranges between 95° and 140°,
wherein a second angle is formed between the first bottom surface of the first solar panel and the horizontal reference surface, and ranges between 0° and 25°; a third angle is formed between the second top surface of the second solar panel and the horizontal reference surface, and ranges between 0° and 20°,
wherein a fourth angle is formed between the second solar panel and the at least one side reflection plate and ranges between 77.5° and 138.5°,
wherein the first solar panel has a high side and a low side opposite to the high side of the first solar panel, wherein the high side of the first solar panel is located farther from the horizontal reference surface than the low side of the first solar panel; the at least one side reflection plate is disposed in a position close to the high side of the first solar panel and away from the low side of the first solar panel, wherein the second solar panel has a high side and a low side opposite to the high side of the second solar panel, the low side of the second solar panel is located farther from the horizontal reference surface than the high side of the second solar panel, and the at least one side reflection plate is disposed in a position close to the low side of the second solar panel and away from the high side of the second solar panel, wherein an area of the first solar panel is greater than an area of the second solar panel, and wherein the second solar panel is located within a projection of the first solar panel.

2. The solar energy generation system as claimed in claim 1, wherein the reflection surface of the bottom reflection plate has a plurality of convex surfaces.

3. The solar energy generation system as claimed in claim 1, wherein the at least one side reflection plate comprises a plurality of side reflection plates; the reflection surface of each of the plurality of side reflection plates faces the first solar panel.

4. The solar energy generation system as claimed in claim 1, wherein the first bottom surface is adapted to convert solar energy to electricity.

5. The solar energy generation system as claimed in claim 1, wherein the reflection surface of the at least one side reflection plate has a glass substrate and a reflection film disposed on the glass substrate; the reflection film includes a connecting layer, a reflection layer, and a protection layer that are stacked in order; a refractive index of the reflection layer to light with a wavelength between 350 nm and 1100 nm ranges between 0.2 and 1.9.

6. The solar energy generation system as claimed in claim 5, wherein a reflectance of the reflection film to light with a wavelength between 350 nm and 1100 nm ranges between 80% and 96%.

7. The solar energy generation system as claimed in claim 5, wherein the connecting layer is a film formed by at least one material selected from a group consisting of $Al_2O_3$, Ni, Cr, $SiO_2$, ITO, Nb, $TiO_2$, and a combination thereof, and has a thickness between 10 Å and 1000 Å.

8. The solar energy generation system as claimed in claim 5, wherein the reflection layer is a film formed by at least one material selected from a group consisting of Ag, Al, silver alloy, and a combination thereof, and has a thickness between 50 Å and 2000 Å.

9. The solar energy generation system as claimed in claim 5, wherein the protection layer is a film formed by at least one material selected from a group consisting of $Al_2O_3$, $Nb_2O_5$, $Ta_2O_5$, $TiO_2$, $SiO_2$, and a combination thereof, and has a thickness between 10 Å and 1000 Å.

* * * * *